US012809900B2

(12) United States Patent
Björkqvist

(10) Patent No.: US 12,809,900 B2
(45) Date of Patent: Nov. 24, 2026

(54) SYSTEM AND METHOD FOR PERFORMING A SEARCH IN A VECTOR SPACE BASED SEARCH ENGINE

(71) Applicant: IPRally Technologies Oy, Helsinki (FI)

(72) Inventor: Sebastian Björkqvist, Helsinki (FI)

(73) Assignee: IPRally Technologies Oy, Helsinki (FI)

( * ) Notice: Subject to any disclaimer, the term of this patent is extended or adjusted under 35 U.S.C. 154(b) by 424 days.

(21) Appl. No.: 17/918,127

(22) PCT Filed: Apr. 10, 2021

(86) PCT No.: PCT/FI2021/050262
§ 371 (c)(1),
(2) Date: Oct. 11, 2022

(87) PCT Pub. No.: WO2021/205080
PCT Pub. Date: Oct. 14, 2021

(65) Prior Publication Data

US 2023/0138014 A1 May 4, 2023

(30) Foreign Application Priority Data

Apr. 11, 2020 (FI) .................................... 20205383

(51) Int. Cl.
*G06F 16/334* (2025.01)
*G06F 16/31* (2019.01)
*G06F 16/332* (2025.01)

(52) U.S. Cl.
CPC ........ *G06F 16/3347* (2019.01); *G06F 16/322* (2019.01); *G06F 16/3325* (2019.01)

(58) Field of Classification Search
CPC . G06F 16/3347; G06F 16/322; G06F 16/3325
See application file for complete search history.

(56) References Cited

U.S. PATENT DOCUMENTS 7,272,593 B1 9/2007 Castelli et al.
7,283,997 B1 10/2007 Howard, Jr. et al.
(Continued)

FOREIGN PATENT DOCUMENTS

EP 1202187 A2 5/2002
EP 3579115 A1 12/2019
(Continued)

OTHER PUBLICATIONS

Hund et al: Subspace Nearest Neighbor Search—Problem Statement, Approaches, and Discussion. International Conference On Image Analysis and Processing, Oct. 17, 2015.
(Continued)

*Primary Examiner* — Sanjiv Shah
*Assistant Examiner* — Ranjit P Doraiswamy
(74) *Attorney, Agent, or Firm* — Laine IP Oy

(57) ABSTRACT

The invention provides a relevance feedback system and computer-implemented method for performing a search in a vector space comprising a first number of target vectors. The method comprises forming a first search query, determining a second number of first search hit vectors among the first number of target vectors based on the first search query vector using a first distance function, determining a third number of flagged vectors, determining a vector subspace spanned by the flagged vectors and/or a second distance function by utilizing the flagged vectors, and determining a plurality of second hit vectors among the target vectors based on the first search query vector and the vector subspace and/or the second distance function.

19 Claims, 5 Drawing Sheets

(56) References Cited

U.S. PATENT DOCUMENTS

| | | | | |
|---|---|---|---|---|
| 10,606,883 | B2 * | 3/2020 | Legrand | G06F 16/34 |
| 2007/0192316 | A1 | 8/2007 | Lee et al. | |
| 2014/0280088 | A1 * | 9/2014 | Speer | G06F 16/3347 707/723 |
| 2019/0065594 | A1 * | 2/2019 | Lytkin | G06F 16/9536 |
| 2020/0081906 | A1 | 3/2020 | Duffy | |

FOREIGN PATENT DOCUMENTS

| | | | |
|---|---|---|---|
| WO | WO2011040931 | A1 | 4/2011 |
| WO | WO2018040503 | A1 | 3/2018 |

OTHER PUBLICATIONS

Melucci: A Basis for Information Retrieval in Context. ACM Translations On Information Systems, Jun. 20, 2008, vol. 26, No. 3, Article 14, pp. 1-41.

* cited by examiner

SYSTEM AND METHOD FOR PERFORMING A SEARCH IN A VECTOR SPACE BASED SEARCH ENGINE

FIELD OF THE INVENTION

The invention relates to vector based search engines. In particular, the invention relates to relevance feedback in such systems, i.e. modifying the search results by additional input given by the user of the system or obtained from other sources.

BACKGROUND OF THE INVENTION

Vector based search engines can be used in many domains, like recommendation systems or similarity search engines. The searchable data units, like documents, are embedded to vectors in some vector space, and searching is done by finding the nearest neighbors to the embedding of the search query. The search query and searchable data can contain for instance text, images, videos or sound files.

As such these search engines are, however, quite limited in their ability to adapt to additional relevance information of the results that may be available from the user, i.e. explicit relevance feedback. They are incapable of reacting to the input of the user, without changing the query and/or re-training of an underlying machine learning model and/or full re-embedding of the whole data, which may be very time consuming actions and in many cases practically impossible to do in the time frame required.

An example of a vector based search engine is disclosed in WO2018040503A1. One existing method for search adaptation is discussed in EP3579115A1, where the scores rendered by the search result-sorting model for the candidate search results are determined according to a similarity degree between an integrated vector representation of the current query and the historical query sequence of the current query and vector representations of candidate search results. Also US20070192316A1 discusses a similarity search engine including a transformation module performing multiple iterations of transformation on a high dimensional vector data set, utilizing dynamic query vector trees and reduced candidate vector sets.

One known method for uses so-called Rocchio algorithm, where an average of the results flagged by the user is used as a basis for a new search query in the vector space. This method, however, in not expressive enough to be used relevance feedback purposes in complex high-dimensional datasets and is also too sensitive for individual erroneous data points.

US2020081906A1 discloses a traditional relevance feedback method using multiple geometric constraints, like a maximum distance from a selected document, on candidate vector space determined in response to relative feedback by the user, filtering candidates in the vector space to develop a set of candidate documents which satisfy the geometric constraints.

U.S. Pat. No. 7,283,997B1 discloses a method in which uses information stored from earlier searches made by a user on a target vector space, i.e. so-called feedback query vectors (FQVs), associated with aggregate user interest based on average of vectors selected by the user. The method has the expressivity restrictions of Rocchio algorithm and is not suitable for instant relevance feedback.

U.S. Pat. No. 7,272,593B1 discloses an image data search utilizing users feedback on good and bad results, by changing distance/similarity measures in a database.

For example in document search systems, where a plurality of documents with a lot of information in each of them are embedded as vectors, it would also be beneficial to quickly find documents that contain particular type of information, as defined by the user, and also to automatically indicate which parts of the documents found are relevant. The previous methods are, however no suitable or efficient or accurate enough for this purpose. It would also be beneficial to be able to improve the results using only positive feedback, i.e. without requiring the user to mark bad results.

There is a need for more expressive adaptive vector based search engines.

SUMMARY OF THE INVENTION

It is an aim of the invention to solve at least some of the abovementioned problems and to provide a new kind of relevance feedback system for vector based search engines that can quickly adapt to additional information obtained.

A particular aim is to provide a machine learning based search engine that requires no modification of the underlying machine learning model in order to refine search results e.g. based on user input.

One additional aim is to provide a relevance feedback method that suits for high-dimensional vector data sets embedding complex information, such as content of natural language documents, for example patent publications.

The method is based on the idea of utilizing the information encoded in the dimensions of the vector space and the flagged results more efficiently, by performing a vector search with a first search query vector, flagging some of the resulting search hit vectors, determining at least one of a vector subspace spanned by the flagged search hit vectors and a second search space distance function by utilizing the flagged search hit vectors, and determining a plurality of second search hit vectors among the target vectors based on the first search query vector and at least one of the vector subspace and the second search space distance function.

Thus, according to some aspects, there is provided a computer-implemented method and a non-transitory computer-readable medium containing computer executable instructions that, when executed by a processor, cause the processor to perform a method, the method comprising performing a search in a vector space based search engine, the vector space comprising a first number of target vectors among which one or more search hit vectors are determined, the method further comprising

- forming a first (initial) search query vector based on search query data,
- determining a second number of first (initial) search hit vectors among the first number of target vectors based on the first search query vector using a first search space distance function, the second number being smaller than the first number,
- determining a third number of flagged search hit vectors, the third number being smaller than the second number,
- creating a second (subsequent) search query vector and/or a second (subsequent) search space distance function based on the flagged search hit vectors and the first search query vector and/or the search query data,
- determining a plurality of second (subsequent) search hit vectors among the target vectors based on the second search query vector and/or the second search space distance function.

The results of each step listed above, as processed by the processor, may be stored in a memory of the computer, to be read and used in the next steps.

The second search query vector can be determined by first determining a vector subspace spanned by the flagged search hit vectors and selecting the search query vector closer to that subspace. On the other hand, the second distance function can utilize the dimension-specific standard deviation of the flagged results.

According to another aspect, there is provided a system for determining a subset of documents among a set of documents, the system comprising

- a vector processing unit adapted to convert the set of documents into a first number of target vectors in a vector space and an initial search query data into a first search query vector,
- a search unit adapted to
  - determine a second number of first search hit vectors among the first number of target vectors based on the first search query vector using a first search space distance function, the second number being smaller than the first number,
  - determine a third number of flagged search hit vectors, the third number being smaller than the second number,
  - create a second search query vector and/or a second search space distance function based on the flagged search hit vectors and the first search query vector and/or the search query data, and
  - determine a plurality of second search hit vectors among the target vectors based on the susbsequent search query vector and/or the second search space distance function, the second search hit vectors corresponding to said subset of documents.

According to a third aspect, there is provided a new use of a vector subspace spanned by a plurality of vectors in an original vector space for fine-tuning search results of vector space based search engine, by determining the subspace using a subset of search hit vectors, and computing a second search query vector using the subspace and an initial search query vector.

More specifically, the invention is characterized by what is stated in the independent claims.

The invention offers significant benefits. First, the adaptation of the search results to the flagged results becomes very fast, as no re-computation of large amounts of vectors or adjustment of vector embedding model are needed. Methods discussed herein for adjustment of the query vector or the distance function are lightweight and efficient.

The methods discussed herein suit particularly well for high-dimensional embedded data, such as vectors with at least 100, typically at least 250 dimensions, for example natural language embedded data, like word vectors, sentence vectors or document vectors. The methods have been shown by the inventor to provide specific advantages in environments where graph-format natural language data is embedded into vectors using a supervised machine learning model. In such and corresponding systems, as both the training set and search space may contain millions of long documents, re-training of the model or re-embedding of all documents is excluded in most cases.

Both the vector subspace based embodiment and distance function based embodiment allow for taking the information encoded in individual dimensions of the vector space, in particular in the close proximity of the relevant hits, to be taken into account, which is not the case in prior art methods.

One of the advantages of the present relevance feedback method in systems with vector-embedded natural language documents is that the new query vector contains information on the common content of the first query vector and the flagged relevant hits. Thus, the new query vector can also be used to indicate the relevant portions of the documents using an explainability subsystem, like that discussed in Finnish patent application 20195411. This is the case in particular with neural network embedders that are trained in supervised fashion according to the sematic and/or technical content of the documents.

The dependent claims are directed to selected embodiments of the invention.

In some embodiments, the method comprises first performing an initial search, then flagging the most relevant results from the initial search and finally performing a new search where the results are modified using the flagged most relevant results.

The method may comprise the steps of creating a query vector using search query data, such as embedding natural language data, performing an initial search with the created query vector, flagging the most relevant results from the initial search, creating a new query vector using the query vector and the flagged relevant results, and performing a new search with the new query vector.

The new query vector can be created by moving the original vector closer to the subspace spanned by the vectors of the flagged relevant.

More particularly, in some embodiments, creating the second search query vector comprises determining a subspace of said vector space, the subspace being spanned by the vectors of the flagged search hit vectors and determining the second search query vector such that it is located closer to that subspace than the first search query vector. The subspace may have N−1 dimensions, where N is the number of flagged search hit vectors.

In some embodiment, the method comprises creating said second search query vector based on the flagged search hit vectors and the first search query vector and/or the search query data, and determining the first search hit vectors and second search hit vectors using the first search space distance function, i.e. the same distance function that is used for the initial search. Typically, the distance function is one that yields the nearest neighbors in a spherical space around the query vector concerned.

In some embodiments the method comprises creating a second search space distance function based on the flagged search hit vectors and the first search query vector and/or the search query data, determining the first search hit vectors using the first search space distance function and the first search query vector and/or the search query data, and determining the second search hit vectors using the second search space distance function and the first search query vector and/or the search query data. That is, different distance functions are used in the initial and subsequent searches, the distance function being adjusted based on the flagged results.

The second search space distance function is created by dividing the distance for each dimension of said vector space by the ratio of change in the standard deviation between the flagged search hit vectors and the first search hit vectors for that dimension.

In some embodiments, the flagged search hit vectors are determined by receiving initial search hit flagging data from a user, typically obtained via user interface means specifically dedicated for flagging the results. Thus, the system is an explicit relevance feedback system.

In some embodiments, the flagged search hit vectors are determined by inferring the most relevant results based on the user's behavior in user interface means while scanning the initial set of results. Thus, the system is an implicit relevance feedback system.

In some embodiments, the flagged search hit vectors are determined automatically using additional information linked with the target vectors and, optionally, the initial search results. Thus, the system is an automatic relevance feedback system.

In some embodiments the search query data comprises natural language data in graph-format, such as tree format, and the first search query vector is formed by embedding the graph into the first search query vector using at least partly neural network-based algorithm, for example by first embedding the nodes of the graph into node vector values and subsequently embedding the graph using the node vector values using a neural network.

In some embodiments, the search query data comprises natural language data units arranged as graph nodes according to meronymity and/or hyponymity relationships between the data units, as inferred from a natural language-containing document.

In some embodiments a supervised machine learning model is used for vector embedding, the model being configured to convert claims and specifications of patent documents into vectors, the learning target of training being, for example, to minimize vector angles between claim and specification vectors of the same patent document and/or claim vectors and specification vectors labeled as relevant (in particular novelty destorying) prior art. Another learning target can be to maximize vector angles between claim and specification vectors of at least some different (no relevant to patentability) patent documents.

The result adaptation can be carried out iteratively as many times as needed. That is, there may be a plurality of subsequent result flaggings, subspace and/or distance function determinations and searches.

Next, selected embodiments of the invention and advantages thereof are discussed in more details with reference to the attached drawings.

DETAILED DESCRIPTION OF EMBODIMENTS

Definitions

Figure 1:
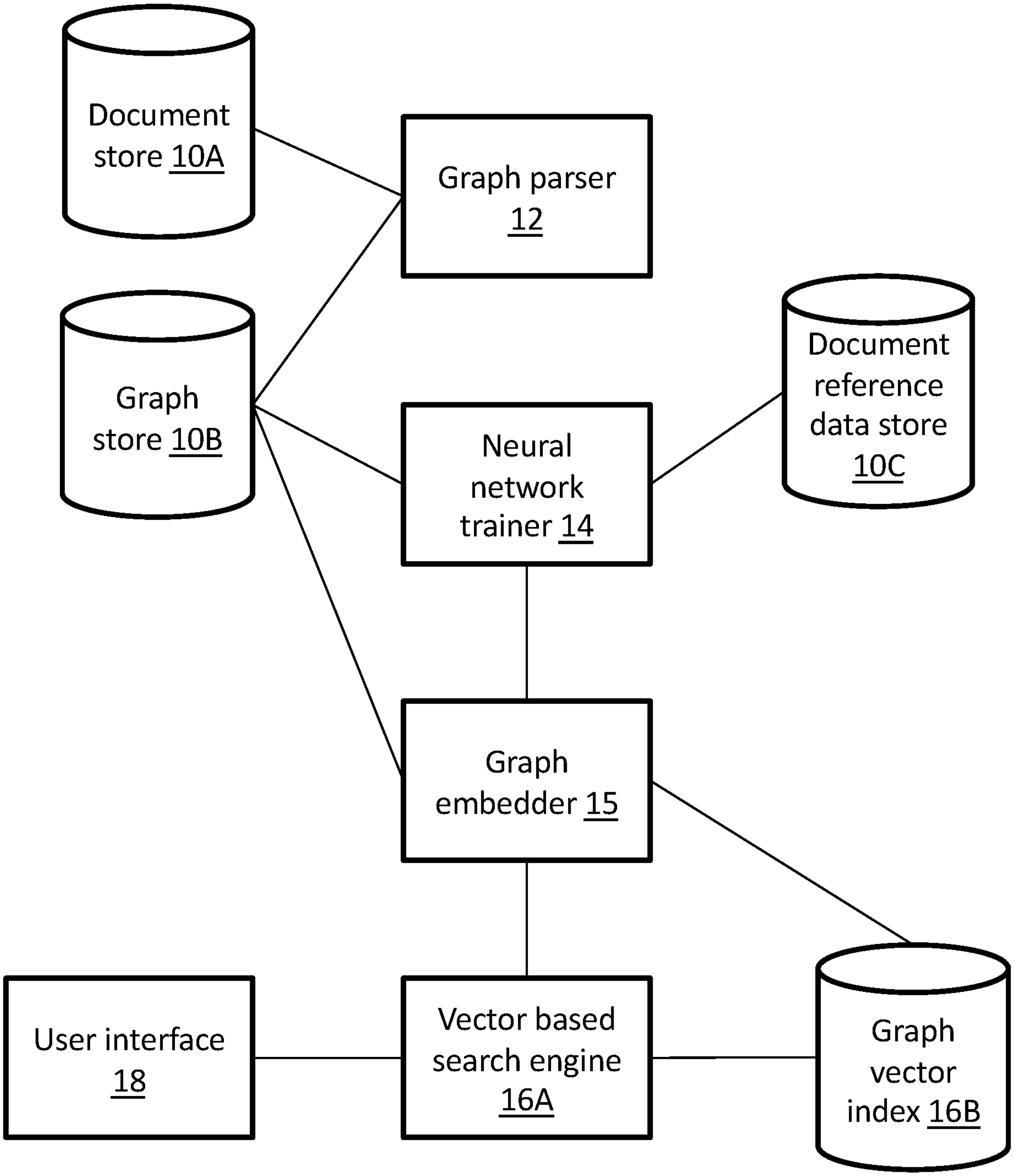
FIG. 1 shows a block chart of an exemplary neural network trained and vector based text document search engine utilizing graph conversion and graph embedding.

"Natural language unit" herein means a chunk of text or, after embedding, vector representation of a chunk of text, i.e. a sentence vector descriptive of the chunk. The chunk can be a single word or a multi-word sub-concept appearing once or more in the original text, stored in computer-readable form. The natural language units may be presented as a set of character values (known usually as "strings" in computer science) or numerically as multi-dimensional vector values, or references to such values. E.g. a bag-of-words or Recurrent Neural Network approaches can be used to produce sentence vectors.

"Block of natural language" refers to a data instance containing a linguistically meaningful combination of natural language units, for example one or more complete or incomplete sentences of a language, such as English. The block of natural language can be expressed, for example as a single string and stored in a file in a file system and/or displayed to the user via the user interface.

"Patent document" refers to the natural language content a patent application or granted patent. Patent documents are associated in the present system with a publication number that is assigned by a recognized patent authority, such as the EPO, WIPO or USPTO, or another national or regional patent office of another country or region. The term "claim" refers to the essential content of a claim, in particular an independent claim, of a patent document. The term "specification" refers to content of patent document covering at least a portion of the description of the patent document. A specification can cover also other parts of the patent document, such as the abstract or the claims. Claims and specifications are examples of blocks of natural language.

"Claim" is herein defined as a block of natural language which would be considered as a claim by the European Patent Office on the effective date of this patent application.

"Edge relation" herein may be in particular a technical relation extracted from a block and/or a semantic relation derived from using semantics of the natural language units concerned. In particular, the edge relation can be

- a meronym relation (also: meronym/holonym relation); meronym: X is part of Y; holonym: Y has X as part of itself; for example: "wheel" is a meronym of "car",
- a hyponym relation (also: hyponym/hypernym relation); hyponym: X is a subordinate of Y; hypernym: X is a superordinate of Y; example: "electric car" is a hyponym of "car", or
- a synonym relation: X is the same as Y.

In some embodiments, the edge relations are defined between successive nodes of a recursive graph, each node containing a natural language unit as node value.

Further possible technical relations include thematic relations, referring to the role that a sub-concept of a text plays with respect to one or more other sub-concepts, other than the abovementioned relations. At least some thematic relations can be defined between successive units. In one example, the thematic relation of a parent unit is defined in the child unit. An example of thematic relations is the role class "function". For example, the function of "handle" can be "to allow manipulation of an object". Such thematic relation can be stored as a child unit of the "handle" unit, the "function" role being associated with the child unit. A thematic relation may also be a general-purpose relation which has no predefined class (or has a general class such as "relation"), but the user may define the relation freely. For example, a general-purpose relation between a handle and a cup can be "[handle] is attached to [cup] with adhesive". Such thematic relation can be stored as a child unit of either the "handle" unit or the "cup" unit, or both, preferably with inter-reference to each other.

"Graph" or "data graph" refers to a data instance that follows a generally recursive and/or network data schema, like a tree schema. The present system is capable of simultaneously containing several different graphs that follow the same data schema and whose data originates from and/or relates to different sources. The graph can in practice be stored in any suitable text or binary format, that allows storage of data items recursively and/or as a network. The graph is in particular a semantic and/or technical graph (describing semantic and/or technical relations between the node values), as opposed to a syntactic graph (which describing only linguistic relations between node values). The graph can be a tree-form graph. Forest form graphs including a plurality of trees are considered tree-form graphs herein. In particular, the graphs can be technical tree-form graphs.

"Data schema" refers to the rules according to which data, in particular natural language units and data associated therewith, such as information of the technical relation between the units, are organized.

"(Natural language) token" refers to a word or multi-word chunk in a larger block of natural language. A token may contain also metadata relating to the word or word chunk, such as the part-of-speech (POS) label or syntactic dependency tag. A "set" of natural language tokens refers in particular to tokens that can be grouped based on their text value, POS label or dependency tag, or any combination of these according to predetermined rules or fuzzy logic.

The terms "data storage unit/means", "processing unit/means" and "user interface unit/means" refer primarily to software means, i.e. computer-executable code, that are adapted to carry out the specified functions, that is, storing of digital data, allowing user to interact with the data, and processing the data, respectively. All of these components of the system can be carried in a software run by either a local computer or a web server, through a locally installed web browser, for example, supported by suitable hardware for running the software components.

It should also be noted that herein using the initial, i.e. first, search query vector equals using the initial search query data, which may be at least partly in natural language form, and the vector embedder.

Description of Selected Embodiments

System Overview

FIG. 1 shows an exemplary vector based search engine system for text document search. The system is particularly suitable in particular for searching technical documents, such as patent documents, or scientific documents. The system comprises a document store 10A, which contains a plurality of natural language documents. A graph parser 12 which is adapted to read documents from the document store 10A and to convert part of all of the contents of the documents into graph format. The converted graphs are stored in a graph store 10B.

The system comprises a neural network trainer unit 14, which receives as training data a set of parsed graphs from the graph store, as well as some information about their relations to each other, which are used to form a training sample set for supervised machine learning. In this case, there is provided document reference data store 10C, including e.g. citation data and/or novelty search result regarding the documents. The trainer unit 14 run a graph-based neural network algorithm that is trained using the training samples, to form a neural network model suitable for embedding graphs into vector form by a graph embedder 15. The graphs from the graph store 10B are embedded into a vector index 16B, to constitute the searchable vector space.

The search engine 16A is capable of finding nearest neighbour vectors from the vector index 16B for a given search query vector. The search query, which may be a document or a graph, obtained through user interface 18 is also embedded into vector form by the graph embedder 15 to obtain the query vector. If the user input is in text format, it can be first converted to graph format by the graph parser 12.

In some embodiments, the embedding is carried out using a graph based neural network model which has been trained using supervised machine learning so as to minimize angles between vectors between graphs with technically similar content, such as patent claim graphs and patent specification graphs that are known to form novelty bars for the respective claim graphs.

The system and embodiments above are described as a non-limiting exemplary embodiments. The invention can be used in connection with any nearest neighbour vector based search engine.

However, the invention provides particular advantages with supervised machine learning vectorization engines, in particular those with complex input, such as natural language, preferably natural language in graph format, that are trained with human labelled training samples. An example is a natural language document search system. In these systems there are usually at least one million searchable documents and/or training samples and re-training or new vector embedding is very time-consuming.

In the following description, a vector based document search engine is use as the primary example.

Amendment of the Search Results

When a user is shown documents most related to the search query, the user may find some of the results more relevant than others. The user can flag the most relevant results and perform the search again. When the search is performed with the query and flagged results a new search query vector is computed by moving the original query vector according to the flagged results, and the new search results are the documents closest to the new query vector.

This process may be repeated several times, i.e. the user can, optionally from the updated search results, again flag the most relevant results to specify in more detail the results the user is looking for.

Instead of having the flagged results provided by the user they can also be selected automatically or semi-automatically using other kind of additional information. As an example, if some kind of document classification is available (for instance a patent classification in the case of a patent search engine) then the user can select the class that he is most interested in. Then all or some of the documents in that class and found in the initial search results are be flagged and the new query vector computed accordingly by moving the original query vector accordingly.

In case the flagged results represent results that are not interesting to the user, the new query vector can be moved further away from the flagged results.

It is also possible to flag both desired and undesired results and then move the query vector closer to the desired ones while making sure not to move it too close to the undesired results.

Next, different realizations of the search result amendment are discussed.

Vector Subspace Based Amendment

Figure 2:
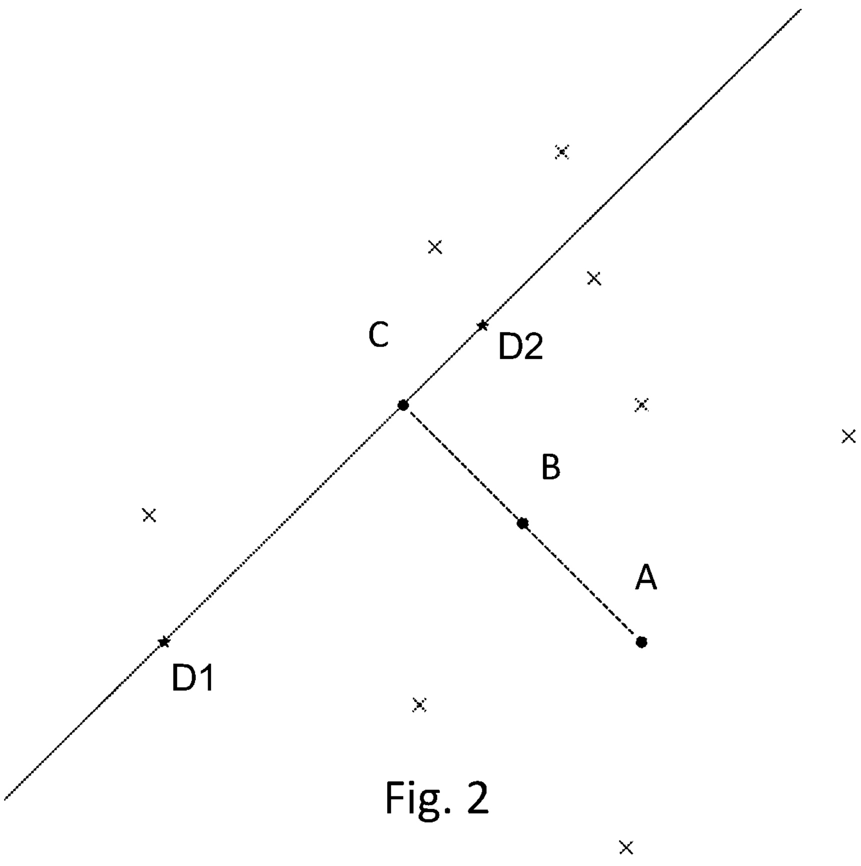
FIG. 2 illustrates the subspace based query vector amendment.

With reference to FIG. 2, in one embodiment the new query vector B is determined in three stages using the original query vector A and 1. The affine vector subspace S spanned by the vectors corresponding to the flagged documents (D1, D2, . . . , Dn) is calculated.
2. The closest vector C to the original query vector in the subspace S is calculated.

This vector will be along the line L perpendicular to the subspace S passing through the original vector A.

3. Finally, the new query vector B is determined by moving the original vector A closer to the subspace S along the line L. The magnitude of movement ("temperature") can be chosen to be e.g. 1-100%, typically 25-100% of the distance between the original query vector A and the closest vector C in the subspace S. The magnitude can be predetermined or dynamically adjusted.

The subspace S will have n−1 dimensions (if the vectors (D1, D2, . . . , Dn) are linearly independent), where n is the amount of flagged results. For instance, if there are two flagged results then the subspace is the unique line passing through the two vectors, and if three results are flagged then the subspace S is the unique plane spanned by the three vectors. In the special case where there is only one flagged result then the subspace S is just a single vector V.

In the exemplary graph-based document search system, where nodes of the graph represents features of the contents of the documents, the idea is that the subspace S describes the common features of the flagged documents (D1, D2, . . . , Dn). Thus, the new query vector represents the original query in the context of the relevant results flagged by the user.

If the document graphs are ordered at least partly e.g. according to meronymity of technical features described in the document, the user can flag documents containing features of particular interest and the search engine can fine-tune the search results to include more documents with similar features.

The closest vector C in the subspace S to the original query vector A can be calculated by using for instance the Gram-Schmidt process to find an orthogonal basis of S and then calculating C as the sum of the projections of A on the basis vectors.

The new query vector B can be calculated by the formula $$B=tC+(1-t)A$$

Here t is a real number between 0 and 1 (inclusive), called the temperature. Temperature 1 means the new query vector B is equal to the closest vector C, and temperature 0 means that the new query vector is the same as the original vector A. The value 0.5 indicates that the new query vector B is halfway between the original vector A and the closest vector C in the subspace S. In FIG. 2, the value 0.5 is used.

The closer the new query vector B resides to the closest vector C, the more the search results will change, as the new search is carried out in the surroundings of the new query vector B. The optimal distance to move the vector depends on the specific search case, especially on the amount of flagged results and the variance of the flagged results. If more flagged results are provided then the subspace S can be considered to be a better estimate of the desired results, and thus a larger temperature can be used. Also if the variance of the flagged results is small then these can be assumed to provide a better estimate of the desired results. This allows for a larger temperature. A good rule of thumb is to start by placing the new query vector B halfway between the original vector A and the closest vector C in the subspace S, i.e. to use temperature 0.5.

The vector subspace based amendment is efficient as fine-tuning method in high-dimensional natural language embedded vector spaces as it allows for finding technical and/or sematic similarities very efficiently. Also, a single incorrect flagged result does not affect the results adversely as much as e.g. in vector averaging based methods.

Distance Function Change Based Amendment

Another way of finding results that are more like the flagged results is keeping the query vector in the same place and instead modifying the way the distance is calculated between the different embeddings. In one embodiment the new search results are determined as follows:

1. The ratio of change $R_i$ in standard deviation for each dimension i between the set vectors of the flagged documents (D1, D2, . . . , Dn) and the set of full search results vectors is calculated. This gives information on how different the flagged results are from the full result set.
2. The original distance function is modified by dividing the distance for each dimension by the ratio of change $R_i$ for that dimension (calculated in step 1).
3. The new search results are generated by searching for the nearest neighbors to the original query vector according to the new distance function created in step 2.

The result of the distance function modification is that the distance along some of the dimensions in the vector space is weighed less than other dimensions. The idea is that if the flagged results have a large variance in some dimension N1 but a small one in another dimension N2 then it is beneficial to look further away in dimension N1 than in dimension N2, since there one may find other documents more like the flagged ones. In effect, one looks for the neighbors nearest to the query vector inside a multidimensional ellipsoid instead of inside a multidimensional sphere.

In step 1 the ratio of change $R_i$ for each dimension can be modified by a temperature exponent t, where t is a real number larger than 0. A larger temperature results in a more drastic change to the distance function.

In case the Euclidean distance function is used the new distance function created in step 2 above looks as follows:

$$d(x, y) = \sqrt{\sum_{i=1}^{n} \frac{(x_i - y_i)}{R_i}},$$

where $R_i$ is the ratio of change in standard deviation for the dimension i and n is the dimension of the vector embeddings.

In summary, the distance function based method comprises the steps of creating a query vector using the search query, performing an initial search with the created query vector, flagging the most relevant results from the initial search, modifying the search space distance function using the flagged relevant results and performing a new search with the query vector using the new (modified) distance function. In one embodiment the new distance function is created by dividing the distance for each dimension by the ratio of change in the standard deviation between the flagged relevant results and the full search results for that dimension.

Instead of an ellipsoid-type distance function, it can be also another type of anisotropic distance function, in contrast to an isotropic, spherical distance function, which is typically used for the initial search.

Applications in a Graph Based Document Search System

Next, a tree-form graph structure applicable in particular for a patent search system, is described with reference to FIGS. 3A and 3B.

Figure 3A:
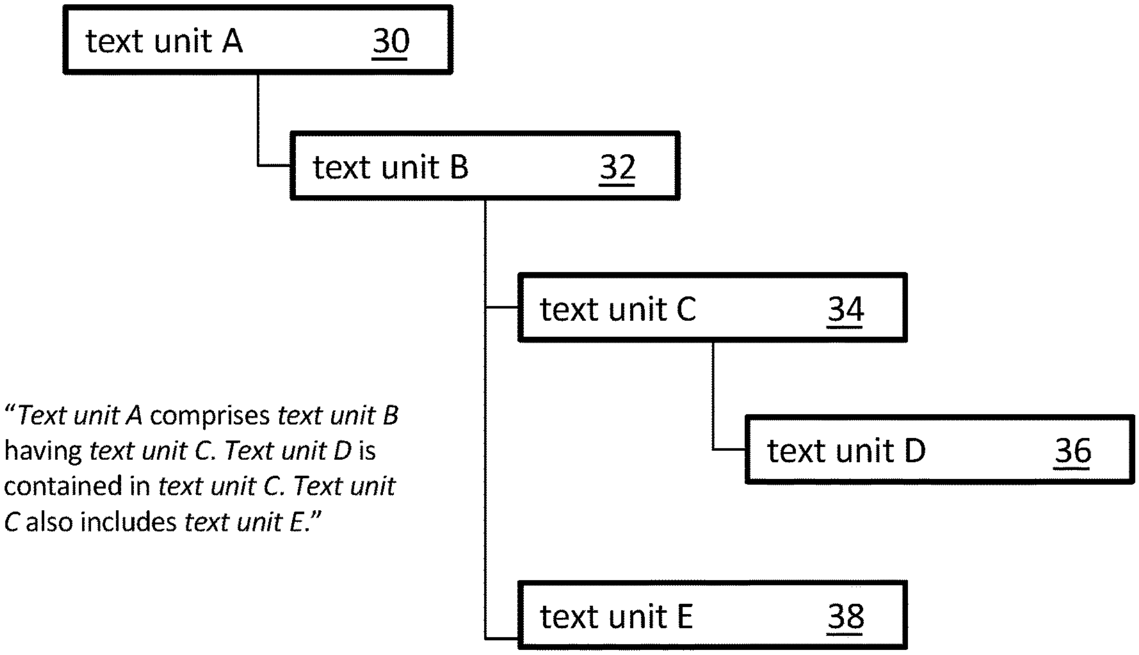
FIG. 3A shows a block diagram of an exemplary graph meronym/holonym edge relations.

FIG. 3A shows a tree-form graph with only meronym relations as edge relations. Text units A-D are arranged as linearly recursive nodes 30, 32, 34, 36 into the graph, stemming from the root node 30, and text unit E as a child of node 32, as a child node 38, as derived from the block of natural language shown. Herein, the meronym relations are detected from the meronym/holonym expressions "comprises", "having", "is contained in" and "includes".

Figure 3B:
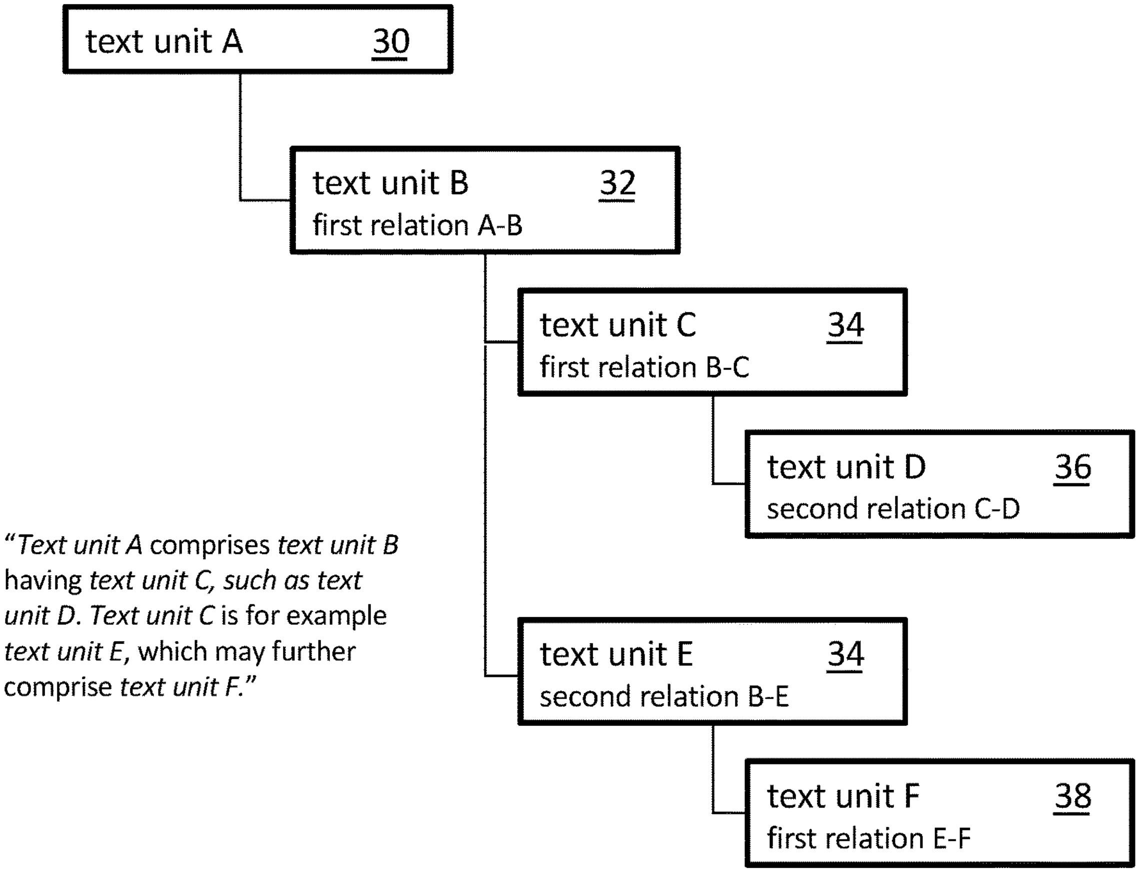
FIG. 3B shows a block diagram of an exemplary graph with meronym/holonym edge relations and hyponym/hypernym edge relations.

FIG. 3B shows another tree-form graph with two different edge relations, in this example meronym relations (first relation) and hyponym relations (second relation). Text units A-C are arranged as linearly recursive nodes 30, 32, 34 with meronym relation. Text unit D is arranged as a child node 36 of parent node 34 with hyponym relation. Text unit E is arranged as a child node 34 of parent node 32 with hyponym relation. Text unit F is arranged as a child node 38 of node 34 with meronym relation. Herein, the meronym and hyponym relations are detected from the meronym/holonym expressions "comprises", "having" and hyponym/hypernym expressions "such as" and "is for example".

According to one embodiment, the graph conversion subsystem is adapted to convert the blocks to graphs by first identifying from the blocks a first set of natural language tokens (e.g. nouns and noun chunks) and a second set of natural language tokens (e.g. meronym and holonym expressions) different from the first set of natural language tokens. Then, a matcher is executed utilizing the first set of tokens and the second set of tokens for forming matched pairs of first set tokens (e.g. "body" and "member" from "body comprises member"). Finally, the first set of tokens is arranged as nodes of said graphs utilizing said matched pairs (e.g. "body"—(meronym edge)—"member").

In one embodiment, at least meronym edges are used in the graphs, whereby the respective nodes contain natural language units having a meronym relation with respect to each other, as derived from said blocks.

In one embodiment, hyponym edges are used in the graph, whereby the respective nodes contain natural language units having a hyponym relation with respect to each other, as derived from the blocks of natural language.

In one embodiment, edges are used in the graph, at least one of the respective nodes of which contain a reference to one or more nodes in the same graph and additionally at least one natural language unit derived from the respective block of natural language (e.g. "is below" [node id: X]). This way, graph space is saved and simple, e.g. tree-form, graph structure can be maintained, still allowing expressive data content in the graphs.

In some embodiments, the graphs are tree-form graphs, whose node values contain words or multi-word chunks derived from said blocks of natural language, typically utilizing parts-of-speech and syntactic dependencies of the words by the graph converting unit, or vectorized forms thereof.

Figure 4:
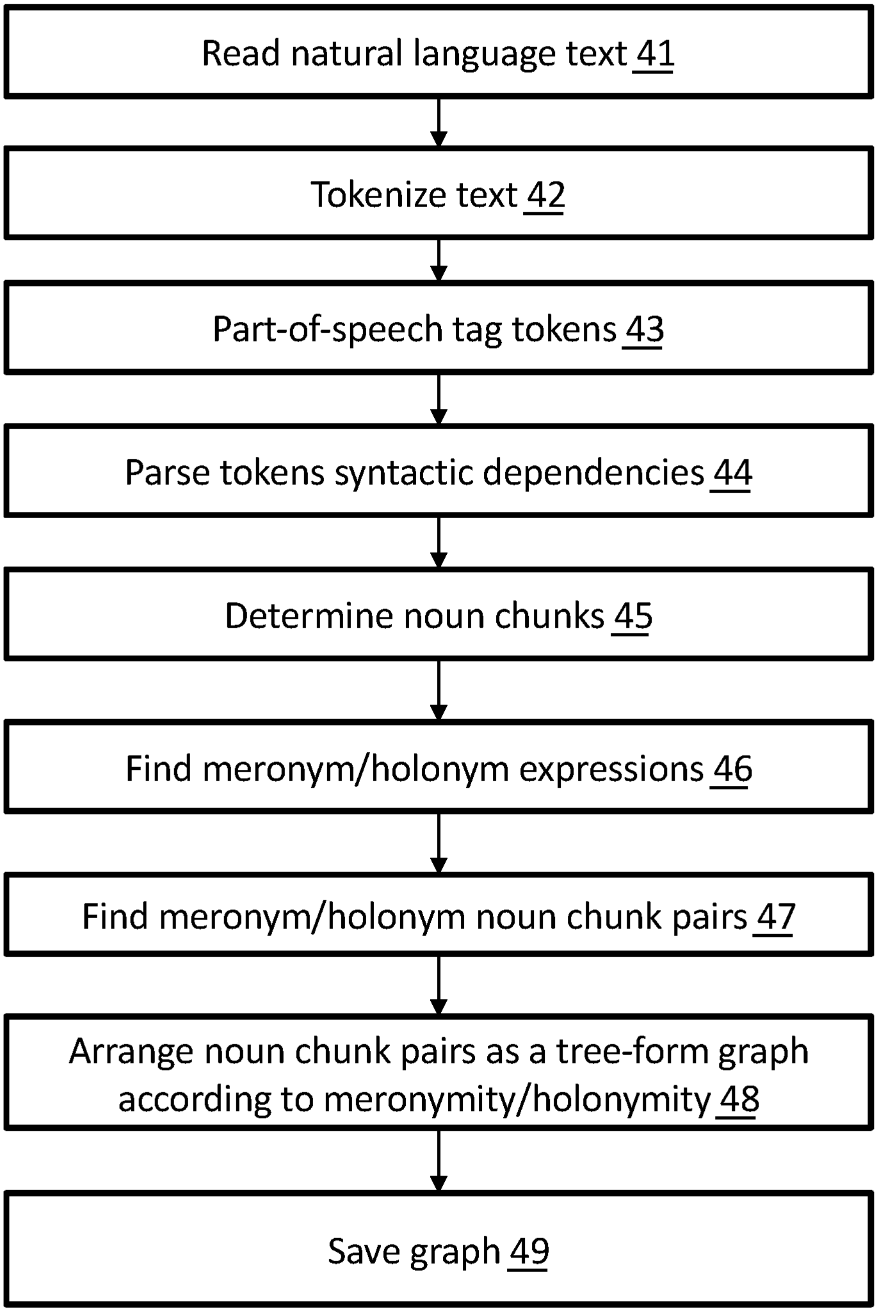
FIG. 4 shows a flow chart of an exemplary graph parsing algorithm.

FIG. 4 shows in detail an example of how the text-to-graph conversion can be carried out in the graph conversion subsystem. First, the text is read in step 41 and a first set of natural language tokens, such as nouns, and a second set of natural language tokens, such as tokens indicating meronymity or holonymity (like "comprising"), are detected from the text. This can be carried out by tokenizing the text in step 42, part-of-speech (POS) tagging the tokens 43, deriving their syntactic dependencies in step 44. Using that data, the noun chunks can be determined in step 45 and the meronym and holonym expressions in step 46. In step 47, matched pairs of noun chunks are formed utilizing the meronym and holonym expressions. The noun chunk pairs form or can be used to infer meronym relation edges of a graph.

In one embodiment, as shown in step 48, the noun chunk pairs are arranged as a tree-form graphs, in which the meronyms are children of corresponding holonyms. The graphs can be saved in step 49 in the graph store for further use, as discussed above.

In one embodiment, the graph-forming step involves the use of a probabilistic graphical model (PGM), such as a Bayesian network, for inferring a preferred graph structure. For example, different edge probabilities of the graph can be computed according to a Bayesian model, after which the likeliest graph form is computed using the edge probabilities.

In one embodiment, the graph-forming step comprises feeding the text, typically in tokenized, POS tagged, dependency parsed and/or noun chunked form, into a neural network based technical parser, which extracts the desired edge relations of the chunks, such as meronym relations and/or hyponym relations.

In one embodiment, the graph is a tree-form graph comprising edge relations arranged recursively according to a tree data schema, being acyclic. This allows for efficient tree-based neural network models of the recurrent or non-recurrent type to be used. An example is the Tree-LSTM model.

In another embodiment, the graph is a network graph allowing cycles, i.e. edges between branches. This has the benefit of allowing complex edge relations to be expressed.

Figure 5:
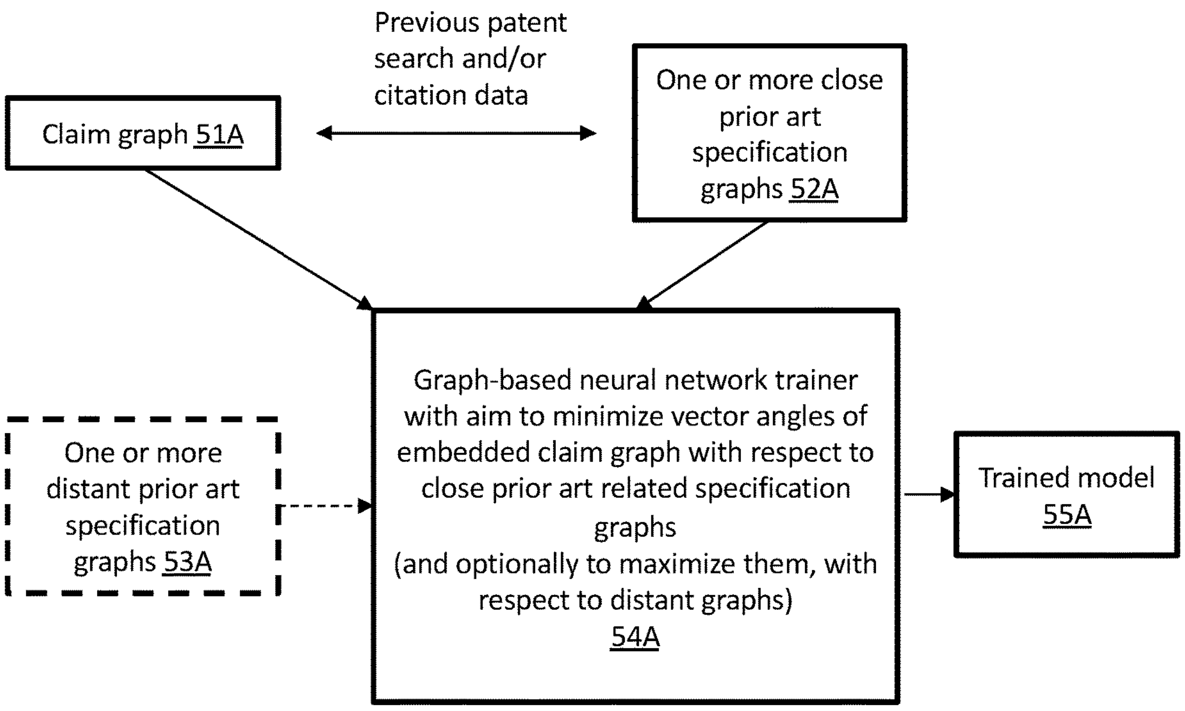
FIG. 5 shows a block diagram of patent search neural network training using patent search/citation data as training data.

FIG. 5 shows an example s of training the neural network in particular for patent search purposes.

For a generic document search engine case, the term "patent document" can be replaced with "document" (with unique computer-readable identifier among other documents in the system). "Claim" can be replaced with "first computer-identifiable block" and "specification" with "second computer-identifiable block at least partially different from the first block".

In the embodiment of FIG. 5, a plurality of claim graphs 51A and corresponding close prior art specification graphs 52A for each claim graph, as related by the reference data, are used by the neural network trainer 54A as the training data. These form positive training cases, indicating that low vector angle between such graphs is to be achieved.

In addition, negative training cases, i.e. one or more distant prior art graphs, for each claim graph, can be used as part of the training data. A high vector angle between such graphs is to be achieved. The negative training cases can be e.g. randomized from the full set of graphs.

According to one embodiment, in at least one phase of the training, as carried out by the neural network trainer 54A, a plurality of negative training cases are selected from a subset of all possible training cases which are harder than the average of all possible negative training cases. For example, the hard negative training cases can be selected such that both the claim graph and the description graph are from the same patent class (up to a predetermined classification level) or such that the neural network has previously been unable to correctly classify the description graph as a negative case (with predetermined confidence).

According to one embodiment, which can also be implemented independently of the other method and system parts described herein, training of the present neural network-based patent search or novelty evaluation system is carried out by providing a plurality of patent documents each having a computer-identifiable claim block and specification block, the specification block including at least part of the description of the patent document. The method also comprises providing a neural network model and training the neural network model using a training data set comprising data from said patent documents for forming a trained neural network model. The training comprises using pairs of claim blocks and specification blocks originating from the same patent document as training samples of said training data set.

Typically, these intra-document positive training samples form a fraction, such as 1-25% of all training samples of the training, the rest containing e.g. search report (examiner novelty citation) training samples.

Vectors obtained from natural language (e.g. patent) documents via the graph conversion and using a supervised neural network model as discussed above forms a complex high-dimensional data set. In such sets, the dimensions of the vector space encode (technical) information which the presently described relevance feedback methods can maximally utilize for fast search result adaptation. It should, however, be noted that although described herein as part of a natural language document search system, the present approach can be used also independently of such system and generally in a nearest neighbor based vector search engines.

The invention claimed is:

1. A computer-implemented method of performing a search in a vector space based search engine, the vector space comprising a first number of target vectors among which one or more search hit vectors are determined, the method comprising:

forming a first search query vector based on search query data, determining a second number of first search hit vectors among the first number of target vectors based on the first search query vector using a first search space distance function, the second number of first search hit vectors being smaller than the first number of target vectors, determining a third number of flagged search hit vectors from among the second number of first search hit vectors, the third number being smaller than the second number, determining at least one of a vector subspace spanned by the flagged search hit vectors and a second search space distance function by utilizing dimension-specific standard deviation of the flagged search hit vectors, and determining a plurality of second search hit vectors among the target vectors based on the first search query vector and at least one of the vector subspace and the second search space distance function.

2. The method according to claim 1, comprising:

determining said vector subspace, determining a second search query vector based on the vector subspace and the first search query vector, and determining the second search query vector such that it is located closer to that subspace than the first search query vector.

3. The method according to claim 2, wherein the second query vector is located on a line passing via the first search query vector and being perpendicular to the subspace.

4. The method according to claim 1, wherein the vector subspace has N−1 dimensions, where N is the number of flagged search hit vectors.

5. The method according to claim 1, further comprising:

determining a second search query vector based on the vector subspace and the first search query vector, and determining the first search hit vectors and second search hit vectors using the second search query vector and the first search space distance function.

6. The method according to claim 1, further comprising:

determining the first search hit vectors using the first search space distance function and the first search query vector, creating said second search space distance function based on the flagged search hit vectors and the first search query vector, and determining the second search hit vectors using the second search space distance function and the first search query vector.

7. The method according to claim 6, wherein the second search space distance function is created by dividing the distance for each dimension of said vector space by the ratio of change in the standard deviation between the flagged search hit vectors and the first search hit vectors for that dimension.

8. The method according to claim 1, wherein the flagged search hit vectors are determined by receiving first search hit flagging data from a user via user interface means.

9. The method according to claim 1, wherein the flagged search hit vectors are determined automatically using additional information linked with the target vectors.

10. The method according to claim 1, wherein:

the search query data comprises natural language data in graph-format, such as tree format, and the first search query vector is formed by embedding the graph into the first search query vector using at least partly neural network-based algorithm.

11. The method according to claim 10, wherein the search query data comprises natural language data units arranged as graph nodes according to meronymity and/or hyponymity relationships between the data units, as inferred from a natural language-containing document.

12. The method according to claim 10, wherein said embedding is carried out using a graph based neural network model which has been trained using supervised machine learning so as to minimize angles between vectors between graphs with technically similar content.

13. A system for determining a subset of documents among a set of documents, the system comprising:

a vector processing unit adapted to convert the set of documents into a first number of target vectors in a vector space and an initial search query data into a first search query vector, and a search unit adapted to:

determine a second number of first search hit vectors among the first number of target vectors based on the first search query vector using a first search space distance function, the second number of first search hit vectors being smaller than the first number of target vectors, determine a third number of flagged search hit vectors, the third number being smaller than the second number, determine at least one of a vector subspace spanned by the flagged search hit vectors and a second search space distance function by utilizing dimension-specific standard deviation of the flagged search hit vectors, and determine a plurality of second search hit vectors among the target vectors based on the first search query vector and at least one of the vector subspace and the second search space distance function, the second search hit vectors corresponding to said subset of documents.

14. The system according to claim 13, being adapted to perform:

forming the first search query vector based the initial search query data, determining the second number of first search hit vectors among the first number of target vectors based on the first search query vector using the first search space distance function, the second number being smaller than the first number, determining the third number of flagged search hit vectors, the third number being smaller than the second number, determining at least one of the vector subspace spanned by the flagged search hit vectors and the second search space distance function by utilizing dimension-specific standard deviation of the flagged search hit vectors, and determining the plurality of second search hit vectors among the target vectors based on the first search query vector and at least one of the vector subspace and the second search space distance function.

15. The system according to claim 13, being adapted to use a vector subspace spanned by a plurality of vectors in an original vector space for fine-tuning search results of vector space based search engine.

16. The method according to claim 1, comprising:

determining said vector subspace, determining a second search query vector based on the vector subspace and the first search query vector, determining the second search query vector such that it is located closer to that subspace than the first search query vector, and determining the first search hit vectors and second search hit vectors using the second search query vector and the first search space distance function.

17. The method according to claim 6, wherein the first distance function is a spherical distance function.

18. The method according to claim 6, wherein the second distance function is an ellipsoidal distance function.

19. The method according to claim 10, wherein nodes of the graph are first embedded into node vector values and subsequently the graph is embedded using the node vector values using a neural network.

* * * * *